United States Patent
Noma et al.

(10) Patent No.: US 6,819,533 B2
(45) Date of Patent: Nov. 16, 2004

(54) MAGNETORESISTIVE HEAD IN WHICH AN INTERLAYER COUPLING FIELD APPLIED TO A FREE MAGNETIC LAYER IS REDUCED

(75) Inventors: Kenji Noma, Kawasaki (JP); Hitoshi Kanai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 63 days.

(21) Appl. No.: 09/729,391

(22) Filed: Dec. 4, 2000

(65) Prior Publication Data

US 2001/0033465 A1 Oct. 25, 2001

(30) Foreign Application Priority Data

Apr. 24, 2000 (JP) ........................................ 2000-122456

(51) Int. Cl.[7] .............................................. G11B 5/39
(52) U.S. Cl. .................................................. 360/324.12
(58) Field of Search ............................ 360/314, 324.11, 360/324.12

(56) References Cited

U.S. PATENT DOCUMENTS

| | | | | |
|---|---|---|---|---|
| 5,287,238 | A | * | 2/1994 | Baumgart et al. |
| 5,508,867 | A | * | 4/1996 | Cain et al. ............. 360/324.11 |
| 5,608,593 | A | * | 3/1997 | Kim et al. ............. 360/324.12 |
| 5,909,345 | A | * | 6/1999 | Kawawake et al. |
| 6,185,078 | B1 | * | 2/2001 | Lin et al. ............... 360/324.12 |
| 6,268,985 | B1 | * | 7/2001 | Pinarbasi ............... 360/324.12 |
| 6,317,297 | B1 | * | 11/2001 | Tong et al. .................. 360/314 |
| 6,466,419 | B1 | * | 10/2002 | Mao ....................... 360/324.12 |
| 6,556,392 | B1 | * | 4/2003 | Mao et al. .............. 360/324.12 |
| 2002/0167769 | A1 | * | 11/2002 | Saito et al. ............. 360/324.12 |

FOREIGN PATENT DOCUMENTS

| | | |
|---|---|---|
| JP | 06223336 A | 8/1994 |
| JP | 09092904 | 4/1997 |
| JP | 10021512 | 1/1998 |
| JP | 10091921 | 4/1998 |
| JP | 10154618 | 6/1998 |
| JP | 10228609 | 8/1998 |
| JP | 10334420 | 12/1998 |
| JP | 11031312 | 2/1999 |

* cited by examiner

Primary Examiner—Craig A. Renner
(74) Attorney, Agent, or Firm—Greer, Burns & Crain, Ltd.

(57) ABSTRACT

There is disclosed a magnetoresistive head in which an interlayer coupling field $H_{in}$ applied to a free magnetic layer is minimized. The magnetoresistive head is provided with a magnetoresistive film including: a first antiferromagnetic layer 2; a pinned magnetic layer 3 formed on the first antiferromagnetic layer 2 and provided with magnetization whose direction is fixed; a first nonmagnetic layer 4 formed on the pinned magnetic layer 3; a free magnetic layer 5 formed on the first nonmagnetic layer 4 and provided with magnetization whose direction changes in accordance with an external magnetic field; a second nonmagnetic layer 6 formed on the free magnetic layer 5; and a second antiferromagnetic layer 7, formed on the second nonmagnetic layer 6, for applying a bias magnetic field generated by static interlayer coupling and directed in a direction opposite to magnetization direction of the pinned magnetic layer 3 to the free magnetic layer 5.

8 Claims, 6 Drawing Sheets

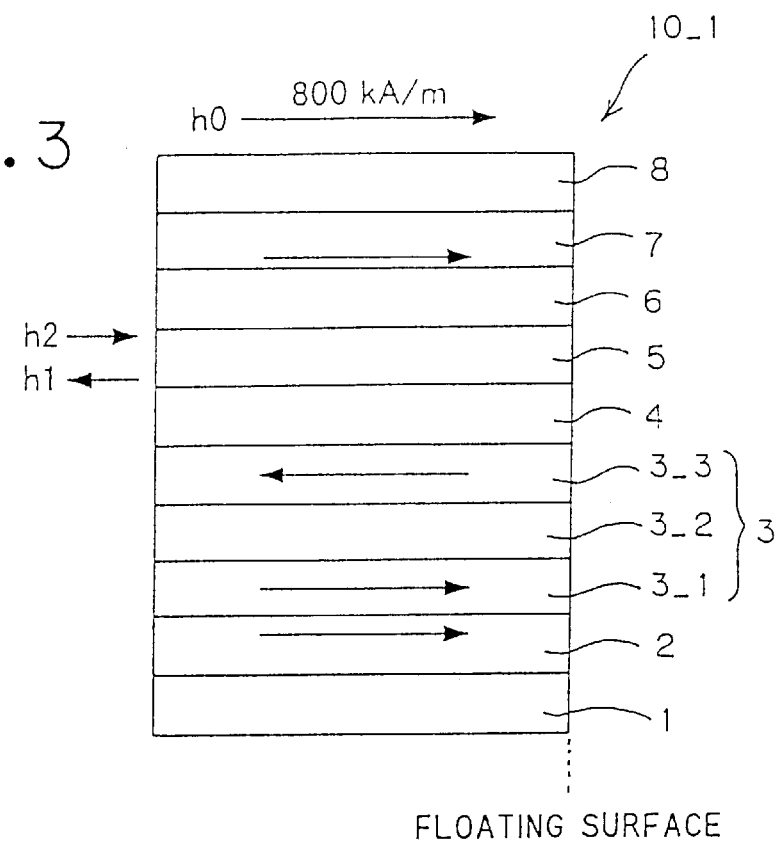
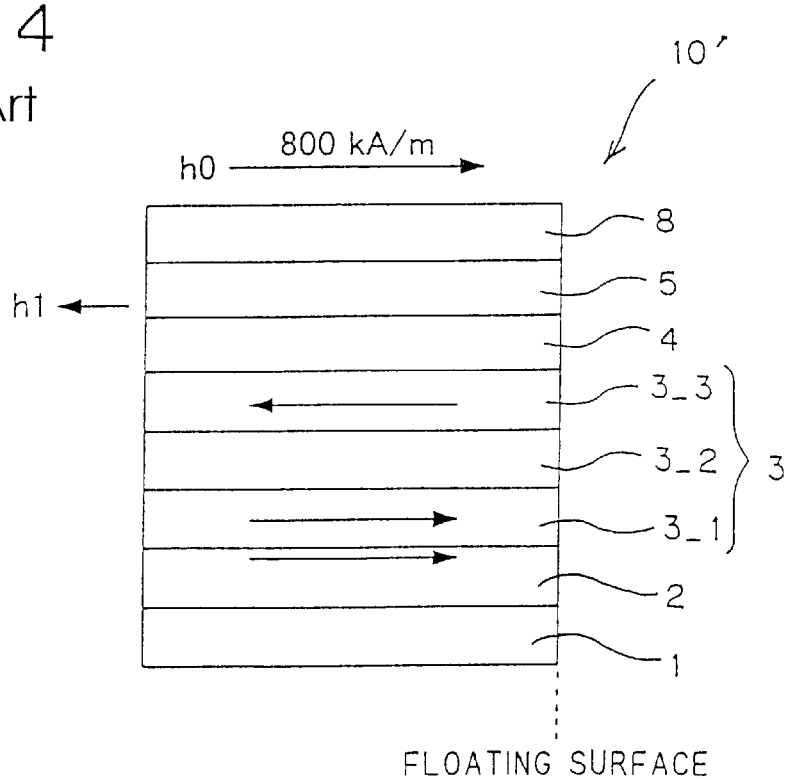

MAGNETORESISTIVE HEAD IN WHICH AN INTERLAYER COUPLING FIELD APPLIED TO A FREE MAGNETIC LAYER IS REDUCED

BACKGROUND OF THE INVENTION i) Field of the Invention

The present invention relates to a magnetoresistive head for utilizing a resistance change in accordance with an external magnetic field intensity to detect the external magnetic field intensity, and an information regeneration apparatus for regenerating information recorded in a recording medium.

ii) Description of Related Art

In recent years, with spread of a computer, a large amount of information has been handled in a daily manner. Such information is usually recorded on a recording medium as a large number of physical marks, and regenerated by an information regeneration apparatus for reading the mark on the recording medium to regenerate an electric regeneration signal.

A hard disk drive (HDD) is one of the information regeneration apparatuses, and is characterized in that a memory capacity is large and access speed to the information is fast. The HDD is generally provided with a magnetic disk as the recording medium whose surface is formed of a magnetic material, and a regeneration head for regenerating the information recorded on the magnetic disk. For the magnetic disk, a surface is magnetized for each micro area (one-bit region), and one bit of information is recorded in a form of a magnetization direction of the one-bit region. The regeneration head is disposed in the vicinity of the magnetic disk, and outputs an electric regeneration signal in accordance with a signal magnetic field $H_{sig}$ generated from the magnetization of the one-bit region of the magnetic disk to regenerate the information recorded on the magnetic disk.

A recording density of the magnetic disk continues to be enhanced year by year, an area of the one-bit region decreases with enhancement of the recording density, and the signal magnetic field $H_{sig}$ generated from the one-bit region is weakened. Therefore, a magnetic head for outputting a large regeneration signal is necessary even for this weak signal magnetic field $H_{sig}$. As the magnetic head for outputting the large regeneration signal, a spin valve is magnetoresistive head which is a magnetoresistive head utilizing a giant magnetoresistive (GMR) effect starts to be put to practical use in earnest. The spin valve magnetoresistive head will be hereinafter referred to as SVMR head.

The SVMR head is provided with a spin valve magnetoresistive film as a multilayered film including a free magnetic layer whose magnetization direction changes in accordance with the external magnetic field, a nonmagnetic layer formed adjacent to the free magnetic layer and provided with conductivity, a pinned magnetic layer formed adjacent to the nonmagnetic layer and having its magnetization direction fixed in a predetermined direction, and an antiferromagnetic layer formed adjacent to the pinned magnetic layer and constituted of an antiferromagnetic material for fixing the magnetization direction of the pinned magnetic layer. For the magnetoresistive film, a resistance change is caused in accordance with a relative angle change of magnetization directions of the free magnetic layer and fixed magnetic layer, a resistivity is minimized when the magnetization directions are directed in the same direction, and the resistivity is maximized when magnetizations are directed in opposite directions. The magnetoresistive film is provided with a pair of electrode terminals, and during operation a sense current is passed through the magnetoresistive film from the pair of electrode terminals. While the sense current flows, and the SVMR head is disposed close to a magnetic disk and relatively moved, an electric resistivity of the magnetoresistive film successively changes in accordance with a signal magnetic field $H_{sig}$ from the magnetic disk, and a regeneration signal with an output voltage represented by a product of the electric resistivity and the sense current value is outputted.

An output of the regeneration signal of the SVMR head is substantially proportional to a difference $\Delta\rho/t$ between a maximum value and a minimum value of a sheet resistance which changes in accordance with the external magnetic field. The difference $\Delta\rho/t$ between the maximum value and the minimum value of the changing sheet resistance will be hereinafter referred to as resistance change $\Delta\rho/t$. In general, since the spin valve magnetoresistive film has a large resistance change $\Delta\rho/t$, the high-output regeneration signal is outputted by the SVMR head. However, it is demanded that a higher output be obtained from the SVMR head by further increasing the resistance change $\Delta\rho/t$. It is known that in order to increase the resistance change $\Delta\rho/t$, thickness of the free magnetic layer and nonmagnetic layer may be reduced. When the thickness of the layer is large, an excess shunt current not contributing to the magnetoresistive effect flows in these layers to decrease the resistance change $\Delta\rho/t$, but a shunt current amount is suppressed by setting these layers to be thin.

However, in the magnetoresistive film, an interlayer coupling field $H_{in}$ attributed to exchange coupling of the magnetizations is applied to the magnetization of the free magnetic layer mainly from the magnetization of the pinned magnetic layer, and with advancement of thinning of the free magnetic layer and nonmagnetic layer, this interlayer coupling field $H_{in}$ increases. For example, the resistance change $\Delta\rho/t$ of the spin valve magnetoresistive film constituted of Ta (50 angstroms)/CoFe (free magnetic layer: 20 angstroms)/Cu (nonmagnetic layer: 30 angstroms)/CoFe (pinned magnetic layer: 20 angstroms)/PtMn (antiferromagnetic layer: 200 angstroms)/Ta (100 angstroms) is about 0.9Ω, but the resistance change $\Delta\rho/t$ is improved to 1.4Ω, by reducing the thickness of the nonmagnetic layer of Cu to 20 angstroms from 30 angstroms. However, by the thickness reduction, the interlayer coupling field $H_{in}$ increases to 2.5 kA/m from 0.4 kA/m.

When the interlayer coupling field $H_{in}$ increases in this manner, in a head state, an angle formed by the magnetization directions of the free magnetic layer and pinned magnetic layer fails to ideally form 90 degrees, and a large deviation is caused. In the large deviating state of the angle, the resistance of the magnetoresistive film fails to linearly respond to the change of the signal magnetic field $H_{sig}$, and symmetrical property of regeneration waveform of the SVMR head is deteriorated with respect to positive/negative signal magnetic field $H_{sig}$. Moreover, the deteriorated symmetrical property results in a decrease of a dynamic range to either one of positive and negative sides of the output voltage, and there arises a problem that a substantial regeneration output decreases.

SUMMARY OF THE INVENTION

The present invention has been developed in consideration of the aforementioned situations, and an object thereof is to provide a magnetoresistive head in which an interlayer coupling field $H_{in}$ applied to a free magnetic layer is minimized, and an information regeneration apparatus provided with the magnetoresistive head.

Among magnetoresistive heads of the present invention for attaining the aforementioned object, a first magnetoresistive head is provided with a magnetoresistive film being a multilayered film including: a pinned magnetic layer having magnetization whose direction is fixed; a free magnetic layer having magnetization whose direction changes in accordance with an external magnetic field; and a first nonmagnetic layer held by the pinned magnetic layer and the free magnetic layer in a layer thickness direction, and indicating a magnitude of resistance in accordance with an angle formed by the magnetization direction of the pinned magnetic layer and the magnetization direction of the free magnetic layer. The magnetoresistive head detects the magnitude of resistance of the magnetoresistive film to detect a strength of the external magnetic field.

The magnetoresistive head comprises: a second nonmagnetic layer disposed adjacent to the surface of the free magnetic layer on a side opposite to the surface of the free magnetic layer on a side of the first nonmagnetic layer; and a bias application layer, disposed adjacent to the surface of the second nonmagnetic layer on a side opposite to the surface of the second nonmagnetic layer on the side of the free magnetic layer, for applying, to the free magnetic layer, a bias magnetic field generated by a static interlayer coupling and directed in a direction opposite to the magnetization direction of the pinned magnetic layer. The bias application layer comprises a material including at least one of an antiferromagnetic material of an ordered form and a hard magnetic material.

As described in the related art, an interlayer coupling field is generally applied to the free magnetic layer from the pinned magnetic layer. Moreover, the interlayer coupling field also includes the bias magnetic field applied to the free magnetic layer from the bias application layer referred to in the present invention. The interlayer coupling field applied to the free magnetic layer as described later is a sum of the interlayer coupling fields applied to the free magnetic layer from the pinned magnetic layer and bias application layer.

When the bias application layer for applying the bias magnetic field to the free magnetic layer is formed as in the first magnetoresistive head of the present invention, a magnitude of the interlayer coupling field applied to the free magnetic layer is reduced by the bias magnetic field.

Moreover, when the bias application layer comprises the material including at least one of the antiferromagnetic material of the ordered form and the hard magnetic material, as described later in an embodiment, reduction of the interlayer coupling field applied to the free magnetic layer is steadily performed. Furthermore, the bias application layer may include a ferrimagnetic material in addition to at least one of the aforementioned magnetic materials.

In the first magnetoresistive head of the present invention, the first nonmagnetic layer preferably comprises copper or an alloy including copper and has a thickness of 26 angstroms or less.

When the first nonmagnetic layer has such thickness, reduction of the interlayer coupling field applied to the free magnetic layer is especially effectively performed.

Moreover, in the first magnetoresistive head of the present invention, the second nonmagnetic layer preferably comprises copper or the alloy including copper and has a thickness in a range of 5 angstroms to 20 angstroms.

In the first magnetoresistive head, as described later in the embodiment and an example, while a large resistance change $\Delta\rho/t$ is kept, the interlayer coupling field applied to the free magnetic layer can be reduced to indicate an appropriate value.

Among the magnetoresistive heads of the present invention for attaining the aforementioned object, a second magnetoresistive head is provided with a magnetoresistive film being a multilayered film including: a pinned magnetic layer having magnetization whose direction is fixed; a free magnetic layer having magnetization whose direction changes in accordance with an external magnetic field; and a first nonmagnetic layer held by the pinned magnetic layer and the free magnetic layer in a layer thickness direction, and indicating a magnitude of resistance in accordance with an angle formed by the magnetization direction of the pinned magnetic layer and the magnetization direction of the free magnetic layer. The magnetoresistive head detects the magnitude of resistance of the magnetoresistive film to detect a strength of the external magnetic field.

The magnetoresistive head comprises:

a second nonmagnetic layer disposed on a side of the free magnetic layer opposite to the first nonmagnetic layer; and a bias application layer, disposed on a side of the second nonmagnetic layer opposite to the free magnetic layer, for applying, to the free magnetic layer, a bias magnetic field generated by a static interlayer coupling, directed in a direction opposite to the magnetization direction of the pinned-magnetic layer and having a strength of 800 A/m or more.

When the bias application layer for applying the bias magnetic field with the strength of 800 A/m or more to the free magnetic layer is formed as in the second magnetoresistive head of the present invention, as described later in the embodiment, the magnitude of the interlayer coupling field applied to the free magnetic layer is effectively reduced by the bias magnetic field.

Moreover, in the second magnetoresistive head of the present invention, the bias application layer comprises at least one material of a material group consisting of an ordered form antiferromagnetic material, a hard magnetic material, and a ferrimagnetic material.

When the bias application layer comprises such material, as described later in the embodiment, the reduction of the interlayer coupling field applied to the free magnetic layer is steadily performed.

Among the magnetoresistive heads of the present invention for attaining the aforementioned object, a third magnetoresistive head is provided with a magnetoresistive film being a multilayered film including:

a first pinned magnetic layer having magnetization whose direction is fixed;

a first nonmagnetic layer formed on the first pinned magnetic layer;

a free magnetic layer formed on the first nonmagnetic layer, and provided with a first soft magnetic layer and a second soft magnetic layer formed of a soft magnetic material and an antiparallel coupling middle layer, formed between the soft magnetic layers, for coupling magnetizations of the soft magnetic layers in opposite directions, in which the magnetization directions of the soft magnetic layers coupled in the opposite directions change in accordance with an external magnetic field;

a second nonmagnetic layer formed on the free magnetic layer; and a second pinned magnetic layer formed on the second nonmagnetic layer and provided with magnetization fixed in the same direction as the magnetization direction of the first pinned magnetic layer, and indicating a magnitude of resistance in accordance with an angle formed by the magnetization direction of the first pinned magnetic layer and the magnetization direction of the first soft magnetic layer. The third magnetoresistive head detects the magnitude of resistance of the magnetoresistive film to detect a strength of the external magnetic field.

In the third magnetoresistive head of the present invention, as described later in the embodiment, since the magnetic field applied to the first soft magnetic layer from the first pinned magnetic layer, and the magnetic field applied to the second soft magnetic layer from the second pinned magnetic layer are substantially mutually offset, an influence by the excessive magnetic field applied to the free magnetic layer is reduced.

Among information regeneration apparatuses of the present invention for attaining the aforementioned object, a first information regeneration apparatus is provided with a magnetic head, disposed in the vicinity of or in contact with a magnetic recording medium on which information is recorded by a magnetization direction, for detecting the magnetization direction of each point of the magnetic recording medium, and regenerates the information in accordance with the magnetization direction of each point of the magnetic recording medium detected by the magnetic head.

The magnetic head is provided with a magnetoresistive film being a multilayered film including: a pinned magnetic layer having magnetization whose direction is fixed; a free magnetic layer having magnetization whose direction changes in accordance with an external magnetic field; and a first nonmagnetic layer held by the pinned magnetic layer and the free magnetic layer in a layer thickness direction, and indicating a magnitude of resistance in accordance with an angle formed by the magnetization direction of the pinned magnetic layer and the magnetization direction of the free magnetic layer. The magnetic head detects the magnitude of resistance of the magnetoresistive film to detect a strength of the external magnetic field.

The magnetic head comprises: a second nonmagnetic layer disposed adjacent to the surface of the free magnetic layer on a side opposite to the side of the first nonmagnetic layer; and a bias application layer, disposed adjacent to the surface of the second nonmagnetic layer on a side opposite to the side of the free magnetic layer, for applying, to the free magnetic layer, a bias magnetic field generated by a static interlayer coupling and directed in a direction opposite to the magnetization direction of the pinned magnetic layer. The bias application layer comprises a material including at least one of an antiferromagnetic material of an ordered form and a hard magnetic material.

Since the first information regeneration apparatus employs the first magnetoresistive head of the present invention as the magnetic head, and the interlayer coupling field applied to the free magnetic layer is reduced, a symmetrical property of a regeneration waveform is high, and a regeneration output is large.

Among the information regeneration apparatuses of the present invention for attaining the aforementioned object, a second information regeneration apparatus is provided with a magnetic head, disposed in the vicinity of or in contact with a magnetic recording medium on which information is recorded by a magnetization direction, for detecting the magnetization direction of each point of the magnetic recording medium, and regenerates the information in accordance with the magnetization direction of each point of the magnetic recording medium detected by the magnetic head.

The magnetic head is provided with a magnetoresistive film being a multilayered film including: a pinned magnetic layer having magnetization whose direction is fixed; a free magnetic layer having magnetization whose direction changes in accordance with an external magnetic field; and a first nonmagnetic layer held by the pinned magnetic layer and the free magnetic layer in a layer thickness direction, and indicating a magnitude of resistance in accordance with an angle formed by the magnetization direction of the pinned magnetic layer and the magnetization direction of the free magnetic layer. The magnetic head detects the magnitude of resistance of the magnetoresistive film to detect a strength of the external magnetic field.

The magnetoresistive head comprises:

a second nonmagnetic layer disposed on a side of the free magnetic layer opposite to the first nonmagnetic layer; and a bias application layer, disposed on a side of the second nonmagnetic layer opposite to the free magnetic layer, for applying, to the free magnetic layer, a bias magnetic field generated by a static interlayer coupling, directed in a direction opposite to the magnetization direction of the pinned magnetic layer and having a strength of 800 A/m or more.

Since the second information regeneration apparatus employs the second magnetoresistive head of the present invention as the magnetic head, and the interlayer coupling field applied to the free magnetic layer is reduced, the symmetrical property of the regeneration waveform is high, and the regeneration output is large.

Among the information regeneration apparatuses of the present invention for attaining the aforementioned object, a third information regeneration apparatus is provided with a magnetic head, disposed in the vicinity of or in contact with a magnetic recording medium on which information is recorded by a magnetization direction, for detecting the magnetization direction of each point of the magnetic recording medium, and regenerates the information in accordance with the magnetization direction of each point of the magnetic recording medium detected by the magnetic head.

The magnetic head is provided with a magnetoresistive film being a multilayered film including:

a first pinned magnetic layer having magnetization whose direction is fixed;

a first nonmagnetic layer formed on the first pinned magnetic layer;

a free magnetic layer formed on the first nonmagnetic layer, and provided with a first soft magnetic layer and a second soft magnetic layer formed of a soft magnetic material and an antiparallel coupling middle layer, formed between the soft magnetic layers, for coupling magnetizations of the soft magnetic layers in opposite directions, in which the magnetization directions of the soft magnetic layers coupled in the opposite directions change in accordance with an external magnetic field;

a second nonmagnetic layer formed on the free magnetic layer; and a second pinned magnetic layer formed on the second nonmagnetic layer and provided with magnetization fixed in the same direction as the magnetization direction of the first pinned magnetic layer, and indicating a magnitude of resistance in accordance with an angle formed by the magnetization direction of the first pinned magnetic layer and the magnetization direction of the first soft magnetic layer. The magnetic head detects the magnitude of resistance of the magnetoresistive film to detect a strength of the external magnetic field.

Since the third information regeneration apparatus employs the third magnetoresistive head of the present invention as the magnetic head, and the interlayer coupling field applied to the free magnetic layer is substantially reduced, the symmetrical property of the regeneration waveform is high, and the regeneration output is large.

BRIEF DESCRIPTION OF THE DRAWINGS

FIG. 3 is a sectional view of a first magnetoresistive film employed in the magnetic head of the present embodiment.

FIG. 4 is a sectional view of a conventional magnetoresistive film.

DETAILED DESCRIPTION OF THE PREFERRED EMBODIMENTS

A preferred embodiment of the present invention will be described hereinafter.

Figure 1:
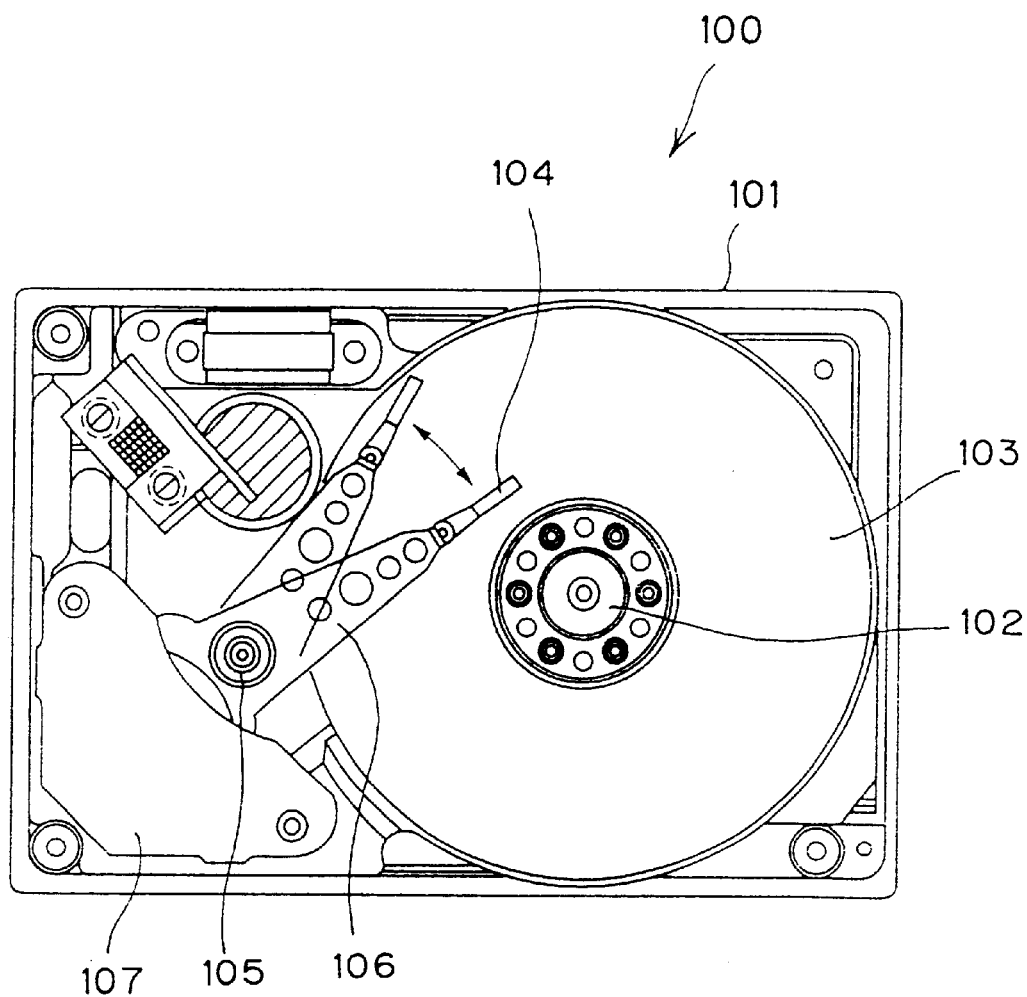
FIG. 1 is a schematic view of a hard disk drive of the present embodiment.

FIG. 1 is a schematic view of a hard disk drive of the present embodiment.

A hard disk drive (HDD) 100 shown in FIG. 1 corresponds to an information regeneration apparatus of the present invention. A housing 101 of the HDD 100 shown in FIG. 1 contains: a rotation shaft 102; a magnetic disk 103 attached to the rotation shaft 102; a floating head slider 104 disposed close to and opposite to the surface of the magnetic disk 103; an arm shaft 105; a carriage arm 106, provided with the floating head slider 104 fixed to a tip end thereof, for horizontally moving on the magnetic disk 103 centering on the arm shaft 105; and an actuator 107 for driving the horizontal movement of the carriage arm 106.

The HDD 100 performs recording of information in the magnetic disk 103, and regeneration of the information recorded in the magnetic disk 103. During the recording and regeneration of the information, first the actuator 107 constituted of a magnetic circuit drives the carriage arm 106, and the floating head slider 104 is positioned in a desired track on the rotating magnetic disk 103. A magnetic head, not shown in FIG. 1, of the present embodiment is mounted on the tip end of the floating head slider 104. The magnetic head corresponds to a magnetoresistive head of the present invention. The magnetic head successively approaches respective one-bit regions arranged on respective tracks of the magnetic disk 103 by rotation of the magnetic disk 103. During the information recording, an electric recording signal is inputted to the magnetic head disposed in the vicinity of the magnetic disk 103 in this manner. The magnetic head applies a magnetic field to each of the one-bit regions in response to the inputted recording signal, and the information carried by the recording signal is recorded in the form of a magnetization direction of the one-bit region. Moreover, during the information regeneration, the magnetic head extracts the information recorded in the form of the magnetization direction of each one-bit region by generating an electric regeneration signal in accordance with the magnetic field generated from magnetization. An inner space of the housing 101 is closed by a cover (not shown).

The magnetic head of the present embodiment will next be described.

Figure 2:
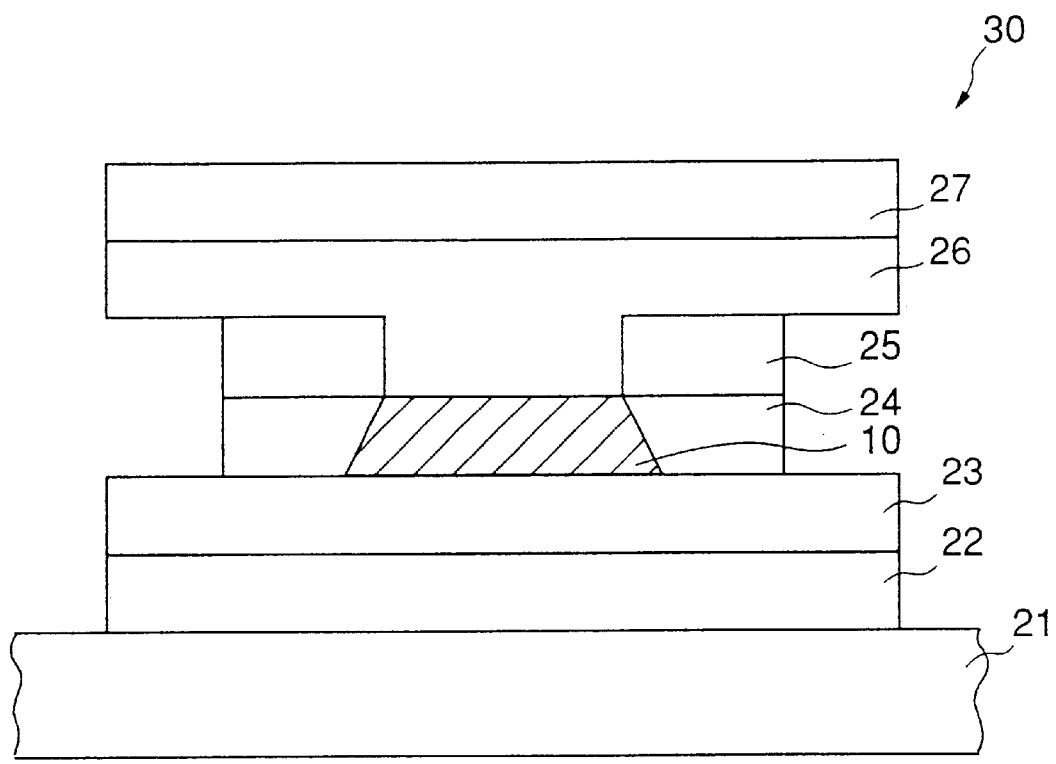
FIG. 2 is a main part sectional view of a magnetic head of the present embodiment.

FIG. 2 is a main part sectional view of the magnetic head of the present embodiment.

A magnetic head 30 of the present embodiment is a composite magnetic head provided with a recording section for recording the information in the magnetic disk 103 and a regeneration section for regenerating the information, and only the regeneration section is shown in FIG. 2. FIG. 2 is a sectional view of the regeneration section of the magnetic head cut along a surface parallel to a floating surface facing the magnetic disk 103 shown in FIG. 1.

The magnetic head 30 includes a nonmagnetic substrate 21, a lower shield layer 22 formed on the nonmagnetic substrate 21, a lower insulation layer 23 formed on the lower shield layer 22, a magnetoresistive film 10 formed on the lower insulation layer 23, a pair of left and right magnetic domain control layers 24 formed on the lower insulation layer 23 to hold the magnetoresistive film 10 from both sides, a pair of left and right electrodes 25 formed on the pair of left and right magnetic domain control layers 24, an upper insulation layer 26 formed on the pair of left and right electrodes 25 and magnetoresistive film 10, and an upper shield layer 27 formed on the upper insulation layer 26. The recording head is formed on the upper shield layer 27.

The substrate 21 is constituted by forming an Si film or an $SiO_2$ film on a substrate formed, for example, of alumina titanium carbide ($Al_2O_3$—TiC).

Each of the lower shield layer 22 and upper shield layer 27 is formed of a soft magnetic material, and magnetically shields the magnetoresistive film 10 in such a manner that an unnecessary external magnetic field fails to be applied to the magnetoresistive film 10. Each of these shield layers is formed, for example, of FeN with a thickness of 1.6 $\mu$m.

Each of the lower insulation layer 23 and upper insulation layer 26 is formed of an insulation material, and prevents a current leak from the magnetoresistive film 10, magnetic domain control layer 24, and the pair of electrodes 25. Each of these insulation layers is formed, for example, of alumina ($Al_2O_3$) with a thickness of 30 nm.

The magnetic domain control layer 24 applies a static magnetic field and a magnetic field by exchange interaction or the like to the magnetoresistive film 10. The magnetic domain control layer 24 is formed of Co—Pt alloy, Co—Cr—Pt alloy or another material indicating a hard magnetic property. Here, the magnetic domain control layer 24 is laminated to provide the same height as that of the magnetoresistive film 10.

The electrode 25 applies a sense current to the magnetoresistive film 10 via the magnetic domain control layer 24, and the regeneration signal is extracted from the pair of electrodes 25. The electrode 25 is formed of conductive materials such as a multilayered film of Ta/(Ti—W)/Ta consisting of two Ta layers and a Ti—W alloy held between these Ta layers.

The magnetoresistive film 10 is a portion having a function of information regeneration of the magnetic head 30. Specifically, the resistance of the magnetoresistive film 10 changes in accordance with the magnetic field generated from the magnetization of each one-bit region of the magnetic disk 103. Since the electrode 25 applies the sense current to the magnetoresistive film 10 as described above, the information carried by the magnetization direction of each one-bit region is extracted as the electric regeneration signal by the resistance change.

A characteristic of the present invention lies in a structure of the magnetoresistive film 10. The structure of the magnetoresistive film will next be described by way of first, second, and third magnetoresistive films as examples of the magnetoresistive film 10.

FIG. 3 is a sectional view of the first magnetoresistive film employed in a magnetic head of the present embodiment.

A first magnetoresistive film 10_1 shown in FIG. 3 is one example of a spin valve magnetoresistive film, and is constituted of: an underlayer 1 formed on the lower insulation layer 23 shown in FIG. 2; a first antiferromagnetic layer 2 formed on the underlayer 1; a pinned layer 3 formed on the first antiferromagnetic layer 2; a first nonmagnetic layer 4 formed on the pinned layer 3; a free magnetic layer 5 formed on the first nonmagnetic layer 4; a second nonmagnetic layer 6 formed on the free magnetic layer 5; a second antiferromagnetic layer 7 formed on the second nonmagnetic layer 6; and a protective layer 8 formed on the second antiferromagnetic layer 7. The first magnetoresistive film 10_1 is trimmed on right and left sides of FIG. 3. Here, the second antiferromagnetic layer 7 corresponds to a bias application layer referred to in the present invention.

Moreover, the first magnetoresistive film 10_1 may be constituted by forming, on the underlayer 1, in reverse to a lamination order described herein, the second antiferromagnetic layer 7, second nonmagnetic layer 6, free magnetic layer 5, first nonmagnetic layer 4, pinned magnetic layer 3, first antiferromagnetic layer 2, and protective layer 8 in this order.

Figure 5:
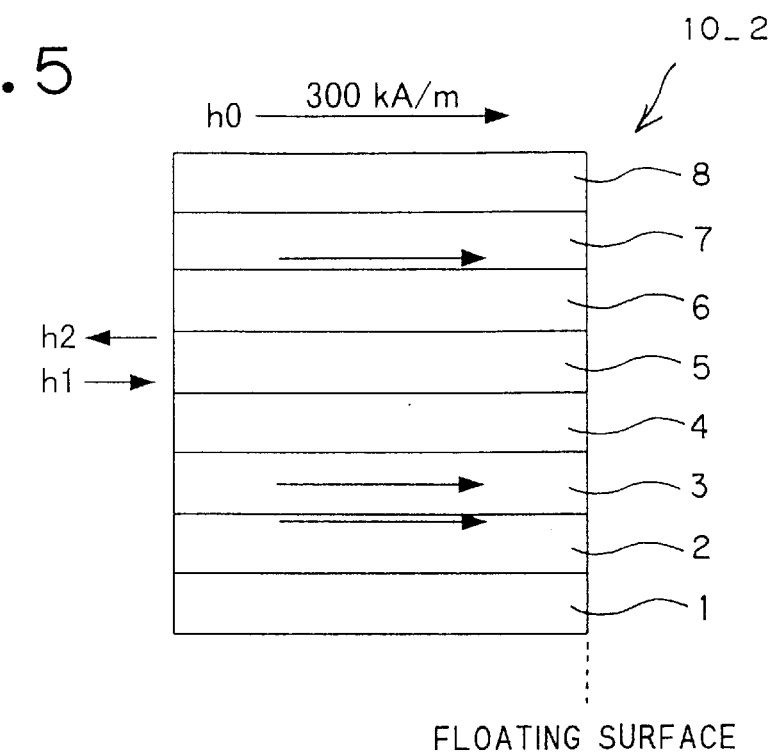
FIG. 5 is a sectional view of a second magnetoresistive film employed in the magnetic head of the present embodiment.
Figure 6:
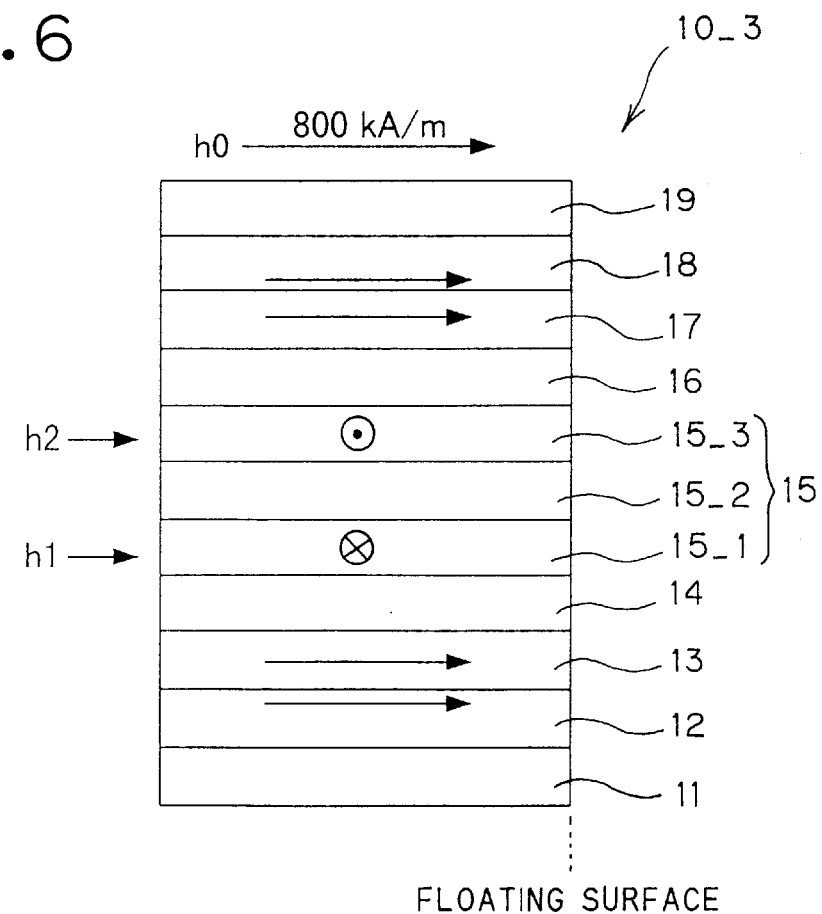
FIG. 6 is a sectional view of a third magnetoresistive film employed in the magnetic head of the present embodiment.

Additionally, FIG. 3 is different from FIG. 2 in a point of view. In FIG. 2, a front surface represents the surface parallel to the floating surface, while in FIG. 3, the right-side surface of the first magnetoresistive film 10_1 corresponds to the floating surface. Additionally, even in FIGS. 4 to 6 showing the following various magnetoresistive films, similarly as FIG. 3, the right-side surface of the magnetoresistive film corresponds to the floating surface.

Moreover, in FIGS. 3, and 4 to 6, the fixed magnetizations and magnetic moments of the respective layers constituting the magnetoresistive film are shown by arrows, but the magnetization of the free magnetic layer is not shown.

Before describing the respective layers constituting the first magnetoresistive film, a conventional magnetoresistive film will be described as a comparison object of the first magnetoresistive film with reference to FIG. 4.

FIG. 4 is a sectional view of the conventional magnetoresistive film.

A conventional magnetoresistive film 10' shown in FIG. 4 is one example of a spin valve magnetoresistive film, and is different from the first magnetoresistive film 10_1 employed in the magnetic head 30 of the present embodiment shown in FIG. 3 in that neither the second nonmagnetic layer 6 nor the second antiferromagnetic layer 7 is disposed and the protective layer 8 is formed on and adjacent to the free magnetic layer 5.

Conversely, the first magnetoresistive film 10_1 employed in the magnetic head 30 of the present embodiment is characterized in that the second nonmagnetic layer 6 and second antiferromagnetic layer 7 are disposed.

The respective layers constituting the first magnetoresistive film 10_1 will be described hereinafter.

The underlayer 1 is a layer as a substrate of the respective layers constituting the first magnetoresistive film 10_1. The underlayer 1 is constituted of a first underlayer formed on the lower insulation layer 23 and formed of Ta with a thickness of 30 angstroms, and a second underlayer formed on the first underlayer and formed of an Ni—Fe—Cr alloy with a thickness of 30 angstroms. The second underlayer, formed on the first underlayer of Ta, has an fcc structure and is oriented in (111) direction.

The first antiferromagnetic layer 2 is formed of an antiferromagnetic material, and applies, to the pinned magnetic layer 3, an interlayer coupling field attributed to exchange coupling. The first antiferromagnetic layer is formed, for example, of a Pd—Pt—Mn alloy with a thickness of 150 angstroms. Here, it is assumed that the first antiferromagnetic layer 2 has a magnetic moment directed to the right as shown by a rightward arrow in FIG. 4, that is, directed in a direction vertical to the floating surface on an interface on the side of the pinned magnetic layer 3. The magnetic moment applies a rightward interlayer coupling field to the pinned magnetic layer 3.

The pinned layer 3 includes a soft magnetic material, and is provided with magnetization whose direction is fixed by the interlayer coupling field applied from the first antiferromagnetic layer 2. The pinned magnetic layer 3 is a so-called laminated ferri-film comprising a first soft magnetic layer 3_1 and second soft magnetic layer 3_3 indicating soft magnetic properties, and an antiparallel coupling middle layer 3_2, held between these soft magnetic layers in a film thickness direction, for coupling the magnetizations of the soft magnetic layers to each other in opposite directions.

The first soft magnetic layer 3_1 is a layer formed adjacent to the first antiferromagnetic layer 2 in the thickness direction, and the second soft magnetic layer 3_3 is a layer formed adjacent to the first nonmagnetic layer 4 in the thickness direction and indicating the soft magnetic property. The first soft magnetic layer 3_1 is formed, for example, of a Co—Fe—B alloy with a thickness of 20 angstroms, and the second soft magnetic layer $3_13$ is, for example, a layer of the Co—Fe—B alloy with a thickness of 25 angstroms. Moreover, the antiparallel coupling middle layer 3_2 is, for example, a layer of Ru with a thickness of 8 angstroms.

For the first soft magnetic layer 3_1 constituting the pinned magnetic layer 3, the magnetization is fixed in the direction shown by the rightward arrow of FIG. 4 by the interlayer coupling field applied from the first antiferromagnetic layer 2. On the other hand, for the second soft magnetic layer 3_3 constituting the pinned magnetic layer 3, the magnetization is fixed by the pin coupling layer 3_2 in such a manner that the magnetization is directed in a direction opposite to that of the magnetization of the first soft magnetic layer 3_1 that is, in a direction shown by a leftward arrow of FIG. 4.

In general, for the pinned magnetic layer 3 constituted of the laminated ferri-film, since the two soft magnetic layers are provided with the magnetizations of the opposite directions, the magnitude of the magnetization of the entire pinned magnetic layer 3 is small. When the magnitude of the magnetization is small, the magnetization is not easily influenced by the magnetic field from the outside, and is stabilized and pinned. Moreover, when the magnetization magnitude is small in this manner, a diamagnetic field of the magnetization is minimized, and disorder of a signal magnetic field $H_{sig}$ from the magnetic disk 103 is also reduced.

The first nonmagnetic layer 4 is a layer formed of a nonmagnetic conductive material, and serves as a spacer for separating the pinned magnetic layer 3 from the free magnetic layer 5. The first nonmagnetic layer 4 is a layer formed, for example, of Cu with a thickness of 20 angstroms. The first nonmagnetic layer 4 may be formed, for example, of an alloy including Cu.

The free magnetic layer 5 is not pinned and is formed of a soft magnetic material provided with magnetization freely rotating in accordance with an external magnetic field. The free magnetic layer 5 is constituted by a 2-layer film, for example, of a layer of a Co—Fe—B alloy with a thickness of 10 angstroms and a layer of an Ni—Fe alloy with a thickness of 40 angstroms. The Co—Fe—B alloy as one material constituting the 2-layer film fails to easily diffuse mutually with Cu as compared with NiFe, and is therefore preferable as the material of the layer formed on the first nonmagnetic layer 4 among the layers constituting the free magnetic layer 5.

The magnetization of the free magnetic layer 5 rotates in a plane of the free magnetic layer 5 in accordance with the magnetic field from the magnetization of each one-bit region of the magnetic disk 103. Sheet resistance of the first magnetoresistive film 10_1 largely changes by a so-called giant magnetoresistive effect in accordance with an angle formed by the magnetization of the free magnetic layer 5 and the fixed magnetization of the pinned magnetic layer 3. For example, the resistance indicates a minimum value when these magnetizations are directed in the same direction, and indicates a maximum value when these magnetizations are directed in opposite directions. A difference between the maximum value and the minimum value constitutes the resistance change $\Delta\rho/t$, and the regeneration signal is outputted through the sense current by the resistance change $\Delta\rho/t$.

The free magnetic layer 5 is given a leftward interlayer coupling field h1 shown by a leftward arrow in FIG. 4 from the second soft magnetic layer 3_3 of the pinned magnetic layer 3, and further given an interlayer coupling field h2 directed in a direction opposite to that of the interlayer coupling field h1 and shown by a rightward arrow in FIG. 4 from the second antiferromagnetic layer 7. The interlayer coupling field h2 corresponds to a bias magnetic field referred to in the present invention.

Additionally, the free magnetic layer 5 is provided with a single magnetic domain by the magnetic field applied by the magnetic domain control layer 24. Therefore, in the magnetic head 30 including the free magnetic layer 5, Barkhausen noise generated in the regeneration signal accompanying a moving magnetic wall is inhibited from occurring. Additionally, the magnetic field applied to the free magnetic layer 5 from the magnetic domain control layer 24 is applied mainly to the end of the free magnetic layer 5, and hardly influences a middle portion of the surface of the free magnetic layer 5. On the other hand, the interlayer coupling fields h1, h2 are applied entirely to the free magnetic layer 5, and influences magnetization rotation of the free magnetic layer 5.

The second nonmagnetic layer 6 is formed of a nonmagnetic conductive material similarly as the first nonmagnetic layer 4, and serves as a spacer for separating the free magnetic layer 5 from the second antiferromagnetic layer 7. The second nonmagnetic layer 6 is a layer formed, for example, of Cu with a thickness of 15 angstroms. The second nonmagnetic layer 6 may be formed, for example, of the alloy including Cu.

The second antiferromagnetic layer 7 is a layer, formed of an antiferromagnetic material of an ordered form, for applying the interlayer coupling field h2 to the free magnetic layer 5. The second antiferromagnetic layer 7 is formed, for example, of a Pd—Pt—Mn alloy with a thickness of 60 angstroms similarly as the first antiferromagnetic layer 2. As described later in manufacture of the magnetoresistive film, the second antiferromagnetic layer 7 has a magnetic moment in the same direction as that of the magnetic moment in the interface of the first antiferromagnetic layer 2 on the side of the pinned magnetic layer 3, on the interface on the side of the second nonmagnetic layer 6 as shown by a rightward arrow.

The magnetic moment applies the interlayer coupling field h2 to the free magnetic layer 5. By appropriately selecting the material and thickness of the second nonmagnetic layer 6, the direction of the interlayer coupling field h2 is set to the same direction as that of the magnetic moment of the interface of the second antiferromagnetic layer 7, that is, the rightward direction opposite to the direction of the interlayer coupling field h1 from the pinned magnetic layer 3 shown in the drawing.

The protective layer 8 is high in anticorrosion, physically and chemically protects the copper oxide layer 7, and is formed, for example, of Ta with a thickness of 100 angstroms.

Additionally, the aforementioned respective layers are preferably provided with the thickness illustrated above and formed of the illustrated materials, but the layers are not necessarily limited to the thickness and materials.

As described above, the first magnetoresistive film 10_1 employed in the magnetic head 30 of the present embodiment is characterized in that the second nonmagnetic layer 6 and second antiferromagnetic layer 7 are disposed. Since there are no layers corresponding to the second nonmagnetic layer 6 and second antiferromagnetic layer 7 in the conventional magnetoresistive film 10', only the interlayer coupling field h1 from the pinned magnetic layer 3 is applied to the free magnetic layer 5.

On the other hand, in the first magnetoresistive film 10_1, since the second antiferromagnetic layer 7 applies the interlayer coupling field h2 opposite in direction to the interlayer coupling field h1 from the pinned magnetic layer 3 to the free magnetic layer 5 disposed via the second nonmagnetic layer 6, an entire interlayer coupling field $H_{in}$ (the entire interlayer coupling field will be hereinafter referred to as the total interlayer coupling field $H_{in}$) constituted of the interlayer coupling fields h1 and h2 applied to the free magnetic layer 5 is reduced and minimized.

The total interlayer coupling field $H_{in}$ changes a response state of resistance of the magnetoresistive film with respect to a signal magnetic field $H_{sig}$. When the total interlayer coupling field $H_{in}$ is zero, a graph of the resistance of the magnetoresistive film with respect to the signal magnetic field $H_{sig}$ is symmetrical with respect to the positive/negative signal magnetic field $H_{sig}$. However, when the total interlayer coupling field $H_{in}$ is present, a symmetrical point of the graph moves to the signal magnetic field $H_{sig}=H_{in}$. In other words, the magnitude of the total interlayer coupling field $H_{in}$ can be obtained by measuring the movement of the symmetrical point.

When the total interlayer coupling field $H_{in}$ is minimized as in the first magnetoresistive film, deviation of an angle formed by the magnetization directions of the free magnetic layer 5 and pinned magnetic layer 3 accompanying the total interlayer coupling field $H_{in}$ is also inhibited. A linear response property of the film resistance with respect to the change of the signal magnetic field $H_{sig}$ is enhanced by inhibiting the angle deviation. Moreover, the magnetic head 30 provided with the magnetoresistive film having the enhanced linear response property constitutes a magnetic head satisfactory in the regeneration waveform symmetrical property and high in output.

Furthermore, the HDD 100, in which the high-output magnetic head 30 with the satisfactory regeneration waveform symmetrical property is employed, is high in sensitivity for detecting the magnetization direction of each point on the magnetic disk 103 and suitable for regeneration of information recorded in high density on a magnetic recording medium.

Additionally, as the material of the second antiferromagnetic layer 7 constituting the first magnetoresistive film 10_1, antiferromagnetic materials of ordered forms, such as a Pd—Pt—Mn alloy, are used. As described below, the antiferromagnetic materials of ordered forms such as PdPtMn, PtMn, NiMn are more preferable as the material of the second antiferromagnetic layer 7 than antiferromagnetic materials of disordered forms such as IrMn, FeMn, NiO.

The antiferromagnetic material of the disordered form is generally low in blocking temperature at which anisotropic properties of the magnetic moments in the surface and interface disappear, and the blocking temperature is 200° C., for example, in NiO. When the blocking temperature is low in this manner, an anisotropic energy of the magnetic moment is usually small. If the second antiferromagnetic layer 7 is formed of the antiferromagnetic material of the disordered form, during operation of the magnetic head, the temperature of the magnetoresistive film rises in a range of 120° C. to 140° C., and the anisotropic property of the magnetic moment is weakened under this high temperature. Since the magnetic field attributed to the sense current, magnetic field from the pinned magnetic layer 3, magnetic field from the magnetic domain control layer 24, and the like are usually applied to the magnetic moment of the antiferromagnetic material during the operation of the magnetic head, the magnetic moment with the weakened anisotropic property becomes small and unstable. Moreover, similarly from the smallness of the anisotropic energy, the magnetic moment is considered to be also weak against electric static discharge destruction. Therefore, when the second antiferromagnetic layer 7 is formed of the antiferromagnetic material of the disordered form, the interlayer coupling field h2 is also weakened and becomes unstable.

On the other hand, the antiferromagnetic material of the ordered form is usually high in blocking temperature, and the anisotropic energy of the magnetic moment in the surface and interface is usually large. Therefore, when the second antiferromagnetic layer 7 is formed of the antiferromagnetic material of the ordered form, the interlayer coupling field h2 is strong and stable in a predetermined direction, and further strong against the electrostatic discharge destruction.

FIG. 5 is a sectional view of a second magnetoresistive film employed in the magnetic head of the present embodiment.

In a second magnetoresistive film 10_2 shown in FIG. 5, a pinned magnetic layer provided with a 3-layer structure of the first magnetoresistive film 10_1 shown in FIG. 3 is replaced with a single-layer pinned magnetic layer 3.

The pinned magnetic layer 3 is formed of a soft magnetic material having magnetization whose direction is fixed by the interlayer coupling field applied from the first antiferromagnetic layer 2. The pinned magnetic layer 3 is, for example, a layer formed of a Co—Fe—B alloy with a thickness of 20 angstroms. The magnetization of the pinned magnetic layer 3 is fixed in a right direction in FIG. 5 by the interlayer coupling field from the first antiferromagnetic layer 2.

The free magnetic layer 5 is provided with the interlayer coupling field h1 by the rightward magnetization of the second soft magnetic layer 3_3 of the pinned magnetic layer 3. Therefore, different from the first magnetoresistive film 10_1 shown in FIG. 3, the interlayer coupling field h1 is directed to the right in FIG. 5.

Moreover, also in the second magnetoresistive film 10_2, the second antiferromagnetic layer 7 has a rightward magnetic moment on the interface with the second nonmagnetic layer 6 in FIG. 5. In the second magnetoresistive film 10_2, by appropriately selecting the material and thickness of the second nonmagnetic layer 6, the free magnetic layer 5 is provided with the leftward interlayer coupling field h2 of the direction opposite to the direction of the magnetic moment by the second antiferromagnetic layer 7 in FIG. 5. Since the two interlayer coupling fields hi, h2 are directed in the opposite directions as described above, even in the second magnetoresistive film 10_2, the total interlayer coupling field $H_{in}$ applied to the free magnetic layer 5 is reduced.

The magnetic head 30 provided with the second magnetoresistive film 10_2 constitutes a magnetic head satisfactory in the regeneration waveform symmetrical property and high in output similarly as the magnetic head provided with the first magnetoresistive film 10_1. Moreover, the HDD 100 in which the magnetic head 30 is employed is high in sensitivity and suitable for the regeneration of information recorded in high density on the magnetic recording medium.

Additionally, in the conventional magnetoresistive film 10', the increase of the interlayer coupling field $H_{in}$ applied to the free magnetic layer 5 particularly raises a problem when the film thickness of the first nonmagnetic layer 4 is 26 angstroms or less. Therefore, the reduction of the interlayer coupling field $H_{in}$ in the first and second magnetoresistive films is particularly effective when the film thickness of the first nonmagnetic layer 4 is 26 angstroms or less.

Moreover, the thickness of the second nonmagnetic layer 6 is preferably in a range of 5 angstroms to 20 angstroms. With the thickness more than 20 angstroms, the interlayer coupling field h2 is too weak, and with the thickness less than 5 angstroms, conversely the interlayer coupling field h2 is so strong that the magnetization of the free magnetic layer 5 is adversely affected.

Furthermore, in the magnetic head provided with the conventional magnetoresistive film 10', when the interlayer coupling field $H_{in}$ applied to the free magnetic layer 5 exceeds 1.6 kA/m, deterioration of the regeneration output cannot be avoided. Therefore, for the magnetic head 30 provided with the first or second magnetoresistive film, in order to effectively reduce the interlayer coupling field $H_{in}$, the second antiferromagnetic layer 7 preferably applies the interlayer coupling field h2 with the magnitude of the half of 1.6 kA/m, that is, 800 A/m or more to the free magnetic layer 5.

FIG. 6 is a sectional view of a third magnetoresistive film employed in the magnetic head of the present embodiment.

A third magnetoresistive film 10_3 shown in FIG. 6 is a dual type spin valve magnetoresistive film, and is constituted of: an underlayer 11 formed on the lower insulation layer 23 shown in FIG. 2; a first antiferromagnetic layer 12 formed on the underlayer 11; a first pinned magnetic layer 13 formed on the first antiferromagnetic layer 12; a first nonmagnetic layer 14 formed on the first pinned magnetic layer 13; a free magnetic layer 15 formed on the first nonmagnetic layer 14; a second nonmagnetic layer 16 formed on the free magnetic layer 15; a second pinned magnetic layer 17 formed on the second nonmagnetic layer 16; a second antiferromagnetic layer 18 formed on the second pinned magnetic layer 17; and a protective layer 19 formed on the second antiferromagnetic layer 18. The third magnetoresistive film 10_3 is trimmed on right and left sides of FIG. 6.

Here, the respective layers constituting the third magnetoresistive film 10_3 will be described by comparison with the respective layers constituting the first magnetoresistive film 10_1.

The underlayer 11 performs the same function as that of the underlayer 1, and is constituted, for example, of a first underlayer formed on the lower insulation layer 23 and formed of Ta with a thickness of 50 angstroms, and a second underlayer formed on the first underlayer and formed of an Ni—Fe alloy with a thickness of 20 angstroms. Moreover, the protective layer 19 performs the same function as that of the protective layer 8, and is, for example, a layer of Ta with a thickness of 100 angstroms.

Each of the first antiferromagnetic layer 12 and second antiferromagnetic layer 18 performs the same function as that of the first antiferromagnetic layer 2. Each of the first antiferromagnetic layer 12 and second antiferromagnetic layer 18 is, for example, a layer of a Pt—Mn alloy with a thickness of 200 angstroms. Here, as described later in the manufacture of the magnetoresistive film, the first antiferromagnetic layer 12 has a magnetic moment in the right direction shown by an arrow in FIG. 6 in the interface on the side of the first pinned magnetic layer 13, and the second antiferromagnetic layer 18 has a magnetic moment in the right direction shown by an arrow in FIG. 6 in the interface on the side of the second pinned magnetic layer 17. These magnetic moments apply the interlayer coupling field of the right direction in FIG. 6 to both the first pinned magnetic layer 13 and the second pinned magnetic layer 17.

Each of the first pinned magnetic layer 13 and second pinned magnetic layer 17 performs the same function as that of the pinned magnetic layer 3. Each of the first pinned magnetic layer 13 and second pinned magnetic layer 17 is, for example, a layer of a Co—Fe alloy with a thickness of 20 angstroms. Each of the magnetization of the first pinned magnetic layer 13 and the magnetization of the second pinned magnetic layer 17 is fixed in the right direction in FIG. 6 by the interlayer coupling fields from the first antiferromagnetic layer 12 and second antiferromagnetic layer 18.

The first nonmagnetic layer 14 and second nonmagnetic layer 16 perform the same function as that of the first nonmagnetic layer 4. The first nonmagnetic layer 14 is, for example, a layer of Cu with a thickness of 36 angstroms, and the second nonmagnetic layer 16 is, for example, a layer of Cu with a thickness of 20 angstroms.

The free magnetic layer 15 performs the same function as that of the free magnetic layer 5. Additionally, the free magnetic layer 15 is a so-called laminated ferri-film comprising a first soft magnetic layer 15_1 formed on the first nonmagnetic layer 14, a second soft magnetic layer 15_3 disposed adjacent to the second nonmagnetic layer 16 in the film thickness direction and formed of the soft magnetic material, and an antiparallel coupling middle layer 15_2, held between these soft magnetic layers, for coupling the magnetizations of the soft magnetic layers to each other in opposite directions. The first soft magnetic layer 15_1 is, for example, a layer of Co—Fe with a thickness of 20 angstroms, and the second soft magnetic layer 15_3 is, for example, a layer of Co—Fe with a thickness of 25 angstroms. The antiparallel coupling middle layer 15_2 is, for example, a layer of Ru with a thickness of 8 angstroms.

Since the second soft magnetic layer 15_3 is thicker than the first soft magnetic layer 15_1, with the magnetization directions of these soft magnetic layers coupled to each other in the opposite directions, the free magnetic layer 15 entirely has the magnetization of the same direction as that of the magnetization of the second soft magnetic layer 15_3, and the entire magnetization rotates in accordance with the external magnetic field with the magnetizations of the respective soft magnetic layers coupled in this manner.

The first soft magnetic layer 15_1 and second soft magnetic layer 15_3 are given the interlayer coupling fields h1, h2 directed in the same direction as shown by the rightward arrow in FIG. 6 from the first pinned magnetic layer 13 and second pinned magnetic layer 17, respectively.

Like the conventional dual magnetoresistive film, if the free magnetic layer 15 is constituted of a single soft magnetic layer, the interlayer coupling fields h1, h2 directed in the same direction are added to each other, and the total interlayer coupling field $H_{in}$ applied to the free magnetic layer 15 is enlarged. On the other hand, when the free magnetic layer 15 is a laminated ferri-film as in the magnetoresistive film 10_3, the respective soft magnetic layers are directed in the opposite directions, the interlayer coupling fields h1, h2 directed in the same direction are therefore applied to the magnetic fields directed in the opposite directions, the influences of the interlayer coupling fields h1, h2 are offset, and the total interlayer coupling field $H_{in}$ exerted on the total magnetization of the free magnetic layer 15 is substantially reduced. The magnitudes of the interlayer coupling fields h1, h2 can be adjusted by the thickness and materials of the respective layers of the magnetoresistive film, such as the first, second nonmagnetic layers and first, second pinned magnetic layers.

The magnetic head 30 provided with the third magnetoresistive film 10_3 also constitutes a magnetic head satisfactory in the regeneration waveform symmetrical property and high in output similarly as the magnetic head provided with the first magnetoresistive film 10_1. Moreover, the HDD 100 in which the magnetic head 30 is employed is also high in sensitivity and suitable for the regeneration of information recorded in high density on the magnetic recording medium.

A method of manufacturing first, second, third magnetoresistive films employed in the magnetic head 30 of the present embodiment will next be described.

For the first magnetoresistive film 10_1, first, by DC magnetron sputtering in an Ar atmosphere, on a multilayered film of the nonmagnetic substrate 21/lower shield layer 22/lower insulation layer 23, adjacent to the underlayer 1, the respective layers constituting the magnetoresistive film 10_1 are continuously laminated using the illustrate materials of the respective layers in the illustrated thickness. Subsequently, by applying, to the entire laminated film, a magnetic field to such an extent that the magnetization of the entire pinned magnetic layer 3 including the antiparallel coupling middle layer 3_2 is saturated, for example, an external magnetic field h0 of 800 kA/m or more in the right direction as shown by a rightward large arrow in FIG. 3, a heat treatment is performed. This heat treatment is performed at a temperature at which the Pd—Pt—Mn alloy constituting the first, second antiferromagnetic layers is regulated, for example, at 250° C.

While the rightward external magnetic field h0 is applied as shown in the drawing, the magnetization of the first soft magnetic layer 3_1 of the pinned magnetic layer 3 and the magnetization of the free magnetic layer 5 are similarly directed to the right. Subsequently, by the heat treatment, the magnetic moment of the interface of the first antiferromagnetic layer 2 on the side of the pinned magnetic layer 3 subjected to interlayer coupling with the magnetization of the first soft magnetic layer 3_1 of the pinned magnetic layer 3, and the magnetic moment of the interface of the second antiferromagnetic layer 7 on the side of the free magnetic layer 5 subjected to interlayer coupling with the magnetization of the free magnetic layer 5 are regulated in the same rightward direction as that of the external magnetic field h0. As described above, the interface magnetic moments are directed in the same direction.

By the aforementioned process, for the first magnetoresistive film 10_1, a resistance change $\Delta\rho/t$ is as large as 1.4Ω, and the total interlayer coupling field $H_{in}$ is as small as −400 A/m. Here, for the total interlayer coupling field $H_{in}$, the direction of the interlayer coupling field h1 from the pinned magnetic layer 3 is set to be positive, and this also applies to the following. Additionally, when the total interlayer coupling field $H_{in}$ is negative, generally by reducing the thickness of the first nonmagnetic layer 4, and increasing the interlayer coupling field h1 to set the magnitude of the total interlayer coupling field $H_{in}$ to be close to 0 and to increase the resistance change $\Delta\rho/t$, formation of more preferable magnetoresistive film can easily be performed.

Also with respect to the second magnetoresistive film 10_2 and third magnetoresistive film 10_3, similarly, the respective layers constituting the magnetoresistive film are continuously laminated in order using the illustrated materials of the respective layers in the illustrated thickness. The second magnetoresistive film 10_2 is formed by subjecting the laminated films to the heat treatment, for example, in a magnetic field of 300 kA/m or more at 250° C. Moreover, the third magnetoresistive film 10_3 is formed by subjecting the laminated films to the heat treatment, for example, in a magnetic field of 800 kA/m or more similarly at 250° C. Even in these magnetoresistive films, the magnetic moment of the interface of the first antiferromagnetic layer and the magnetic moment of the interface of the second antiferromagnetic layer in the magnetoresistive film are directed in the same direction.

Additionally, the magnetoresistive film employed in the magnetoresistive head of the present invention is not limited to the magnetoresistive film illustrated in the present embodiment. The magnetoresistive head of the present invention is intrinsically constituted by adding a new layer for generating the interlayer coupling of the direction opposite to that of the interlayer coupling applied to the free magnetic layer from the pinned magnetic layer, and may be the magnetic head including such new layer. For example, the respective layers constituting the magnetoresistive film, such as the free magnetic layer, the nonmagnetic layer and the second antiferromagnetic layer may be provided with a multilayered structure. Particularly, when the free magnetic layer of the second magnetoresistive film 10_2 is replaced with the free magnetic layer of the laminated ferri-film, with a mechanism similar to that of the third magnetoresistive film 10_3, the total interlayer coupling field $H_{in}$ is considered to be effectively reduced.

Moreover, in the present embodiment, the interlayer coupling field h2 is generated by the second antiferromagnetic layer, but in the present invention, instead of the second antiferromagnetic layer, the layer of the hard magnetic material having the magnetization fixed in one direction may be employed, and the layer of the material including at least one of the antiferromagnetic material and hard magnetic material may be employed. Moreover, in addition to these magnetic materials, the layer of the material including the ferrimagnetic material may be employed. Even by the layer of these substitute materials, the interlayer coupling field h2 is applied to the free magnetic layer, and the total interlayer coupling field $H_{in}$ applied to the free magnetic layer is minimized.

EXAMPLES

An example of the present invention will be described hereinafter.

<Dependence on Thickness of Second Antiferromagnetic Layer>

Measurement results of dependence of the resistance change $\Delta\rho/t$ of the magnetoresistive film different from the first magnetoresistive film 10_1 of the embodiment only in each layer thickness and some materials and the total interlayer coupling field $H_{in}$ applied to the free magnetic layer 5 of the magnetoresistive film on the thickness of the second antiferromagnetic layer 7 will be described hereinafter.

In this measurement, used was a sample of the magnetoresistive film provided with a constitution of Ta (50 angstroms)/NiFe (18 angstroms)/PdPtMn (150 angstroms)/CoFeB (12.5 angstroms)/Ru (7.5 angstroms)/CoFeB (22.5 angstroms)/Cu (26 angstroms)/CoFeB (10 angstroms)/NiFe (40 angstroms)/Cu (15 angstroms)/PdPtMn ($t_{PdPtMn2}$ angstroms)/Ta (30 angstroms) formed on an Si/SiO$_2$ substrate. The second antiferromagnetic layer 7 is a layer of a Pd—Pt—Mn alloy with a thickness of $t_{PdPtMn2}$ angstroms, and here four samples with the layer thickness $t_{PdPtMn2}$ of 0, 40, 80, 100 angstroms were prepared. Additionally, affixed numeral 2 of the thickness $t_{PdPtMn2}$ means the thickness of the second antiferromagnetic layer 7. These samples were formed in the method described in the embodiment.

Figure 7:
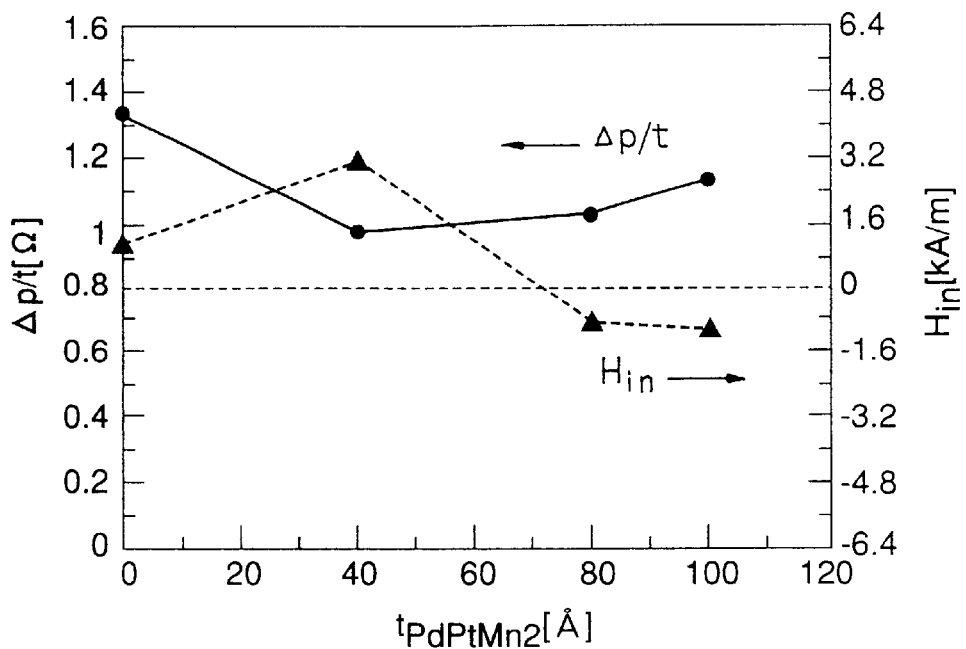
FIG. 7 is a graph showing dependence of a resistance change $\Delta\rho/t$ and total interlayer coupling field $H_{in}$ of the magnetoresistive film on a thickness of a second antiferromagnetic layer.

FIG. 7 is a graph showing the dependence of the resistance change $\Delta\rho/t$ of the magnetoresistive film and the total interlayer coupling field $H_{in}$ on the thickness of the second antiferromagnetic layer.

The abscissa of FIG. 7 indicates the thickness $t_{PdPtMn2}$ of the second antiferromagnetic layer 7 of the Pd—Pt—Mn alloy of the magnetoresistive film, and the ordinate of FIG. 7 shows the resistance change $\Delta\rho/t$ and interlayer coupling field $H_{in}$ of the magnetoresistive film.

In FIG. 7, respective measurement results of the resistance change $\Delta\rho/t$ for the four samples are shown by black circles, and the measurement results for the four samples with the total interlayer coupling field $H_{in}$ are shown by black triangles. These black circles are guided and connected to one another by a solid line, and the black triangles are guided and connected to one another by a dotted line.

As shown by the black circles of FIG. 7, when the thickness $t_{PdPtMn2}$ of the second antiferromagnetic layer 7 is 0 angstrom, that is, when the second antiferromagnetic layer 7 is absent, a value of the resistance change $\Delta\rho/t$ is 1.3Ω. However, when the second antiferromagnetic layer 7 exists and the thickness $t_{PdPtMn2}$ is 100 angstroms or less, the value decreases below 1.3Ω, but a high value of 0.95Ω or more is kept.

As shown by the black triangles of FIG. 7, when the thickness $t_{PdPtMn2}$ of the second antiferromagnetic layer 7 is 0 angstrom, the total interlayer coupling field $H_{in}$ is 1 kA/m. When the thickness $t_{PdPtMn2}$ of the second antiferromagnetic layer 7 is 40 angstroms, the value increases to 3 kA/m. However, with 60 angstroms or more, the value becomes smaller than the value of 1 kA/m with the thickness $t_{PdPtMn2}$ of 0 angstroms, with 70 angstroms or more, the value turns to be negative, and with 100 angstroms, the value is −1 kA/m.

In this case, the interlayer coupling field h1 applied to the free magnetic layer 5 from the pinned magnetic layer 3 is 1 kA/m, and the interlayer coupling field h2 applied to the free magnetic layer 5 from the second antiferromagnetic layer 7 indicates a large value of 2 kA/m in a direction opposite to that of the interlayer coupling field h1, for example, when the thickness $t_{PdPtMn2}$ of the second antiferromagnetic layer 7 is 100 angstroms.

As seen from these measurement results, by the presence of the second antiferromagnetic layer 7, while the resistance change Δρ/t of the magnetoresistive film is kept at a high value, the total interlayer coupling field $H_{in}$ applied to the free magnetic layer 5 can be reduced.

<Dependence on Thickness of Second Nonmagnetic Layer>

Measurement results of the dependence of the resistance change Δρ/t of the magnetoresistive film of the same type as that of the first magnetoresistive film 10_1, and the interlayer coupling field $H_{in}$ applied to the free magnetic layer 5 of the magnetoresistive film on the thickness of the second nonmagnetic layer 6 will be described hereinafter.

In this measurement, used was a sample of the magnetoresistive film provided with a constitution of Ta (50 angstroms)/NiFe (18 angstroms)/PdPtMn (150 angstroms)/CoFeB (12.5 angstroms)/Ru (7.5 angstroms)/CoFeB (22.5 angstroms)/Cu (24 angstroms)/CoFeB (10 angstroms)/NiFe (40 angstroms)/Cu ($t_{cu2}$ angstroms)/PdPtMn (80 angstroms)/Ta (30 angstroms) formed on the Si/SiO₂ substrate. Here, the second nonmagnetic layer 6 is a layer of Cu with a thickness of $t_{cu2}$ angstroms, and here six samples with the layer thickness $t_{cu2}$ of 0, 9, 12, 15, 18, 21 angstroms were prepared. Additionally, the affixed numeral 2 of the thickness $t_{cu2}$ means the thickness of the second nonmagnetic layer 6. These samples were formed in a method described in the embodiment.

Figure 8:
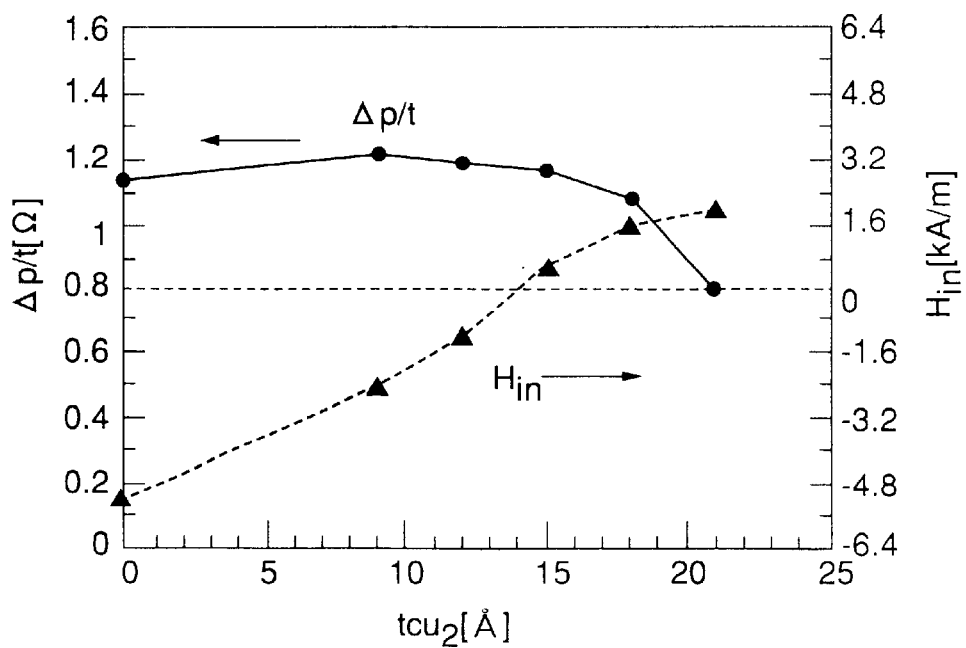
FIG. 8 is a graph showing the dependence of the resistance change $\Delta\rho/t$ and total interlayer coupling field $H_{in}$ of the magnetoresistive film on the thickness of a second nonmagnetic layer.

FIG. 8 is a graph showing the dependence of the resistance change Δρ/t of the magnetoresistive film and the total interlayer coupling field $H_{in}$ on the thickness of the second nonmagnetic layer 6.

The abscissa and ordinate of FIG. 8 are the same as the abscissa and ordinate of FIG. 7. Moreover, in FIG. 8, for the six samples, in the same manner as in FIG. 7, the measurement results of the resistance change Δρ/t are shown by black circles, and the respective measurement results of the total interlayer coupling field $H_{in}$ are shown by the black triangles. The black circles are guided and connected to one another by the solid line, and the black triangles are guided and connected to one another by the dotted line.

As shown by the black circles of FIG. 8, when the thickness $t_{cu2}$ of the second nonmagnetic layer 6 is in a range of 0 to 18 angstroms, the value of the resistance change Δρ/t is kept at a high value of 1.1 to 1.2Ω. When the thickness $t_{cu2}$ increases to 21 angstroms, the value of the resistance change Δρ/t decreases but is kept at 0.8Ω or more.

As shown by the black triangles of FIG. 8, when the thickness $t_{cu2}$ of the second nonmagnetic layer 6 is 0 angstrom, that is, when the second nonmagnetic layer 6 is absent, the interlayer coupling field h2 from the second antiferromagnetic layer 7 is very large, and the total interlayer coupling field $H_{in}$ therefore indicates a large value of −5 kA/m or less in a negative direction. As the thickness $t_{cu2}$ of the second nonmagnetic layer 6 increases, the total interlayer coupling field $H_{in}$ approaches 0 kA/m, and turns to be positive at 14 angstroms. When the thickness $t_{cu2}$ further increases, the total interlayer coupling field $H_{in}$ further increase in a positive direction and exceeds 1.6 kA/m at 20 angstroms.

As seen from the measurement result, when the thickness $t_{cu2}$ of the second nonmagnetic layer 6 is too large, the total interlayer coupling field $H_{in}$ exceeds 1.6 kA/m at which output deterioration raises a problem. Therefore, the thickness $t_{cu2}$ of the second nonmagnetic layer 6 is preferably 20 angstroms or less. Moreover, when the thickness $t_{cu2}$ is too small, the total interlayer coupling field $H_{in}$ excessively increases in the negative direction. In general, when the total interlayer coupling field $H_{in}$ is negative, it is easy to bring the total interlayer coupling field $H_{in}$ close to 0 kA/m by reducing the thickness of the pinned magnetic layer 3. However, when the total interlayer coupling field $H_{in}$ is too large even in the negative direction, it is difficult to bring the value close to 0 kA/m. Therefore, the thickness $t_{cu2}$ of the second nonmagnetic layer 6 is preferably 5 angstroms or more.

As seen from these measurement results, by adjusting the thickness of the second nonmagnetic layer, the value of the resistance change Δρ/t of the magnetoresistive film is kept to be high, and the total interlayer coupling field $H_{in}$ applied to the free magnetic layer can be adjusted to provide an appropriate value.

<Dependence of Regeneration Output on Total Interlayer Coupling Field $H_{in}$>

Simulation results of the dependence of the magnetic head regeneration output on the magnitude of the total interlayer coupling field $H_{in}$ applied to the free magnetic layer of the magnetoresistive film disposed on the magnetic head will be described hereinafter.

The simulation was performed using the conventional magnetic head provided with the conventional magnetoresistive film including neither the second nonmagnetic layer nor the second antiferromagnetic layer as a target. However, by regarding the total interlayer coupling field $H_{in}$ applied to the free magnetic layer as the interlayer coupling field applied from both the pinned magnetic layer and the second antiferromagnetic layer, the simulation can also be applied to the magnetic head provided with the magnetoresistive film of the present invention.

The simulation was performed by micro-magnetics of dividing each of the free magnetic layer and the pinned magnetic layer into two-dimensional meshes and calculating movement of the magnetic moment present in each mesh region. In the simulation, assuming that external magnetic field $H_{sig}$, magnetic field $H_{hard}$ from the magnetic domain control layer, interlayer coupling field $H_{in1}$ from the pinned magnetic layer, and diamagnetic field $H_{d1}$ are applied to the respective magnetic moments in the free magnetic layer and that the external magnetic field $H_{sig}$, magnetic field $H_{hard}$ from the magnetic domain control layer, interlayer coupling field $H_{in2}$ from the free magnetic layer, diamagnetic field $H_{d2}$, and the interlayer coupling field $H_{ua}$ from the first antiferromagnetic layer are applied to the respective magnetic moments in the pinned magnetic layer, arrangement of directions of the respective magnetic moments were obtained in stable equilibrium states of the respective magnetic moments.

Here, the positions of the free magnetic layer and pinned magnetic layer in spread directions are defined by xy coordinate, and when the respective magnetic moments are in the equilibrium states, the angle of the magnetic moment of the free magnetic layer in position (x, y) is represented by $\theta_f(x, y)$ and the angle of the magnetic moment of the pinned magnetic layer in the position (x, y) is represented by $\theta_p(x, y)$. In this case, an output of the magnetoresistive film having the magnetic moment defined by these angles $\theta_f(x, y)$, $\theta_p(x, y)$ is proportional to cosine cos<$\theta_f(x, y)-\theta_p(x, y)$> of an average value <$\theta_f(x, y)-\theta_p(x, y)$> in the position (x, y) of all the magnetic moments of an angle difference $\theta_f(x, y)-\theta_p(x, y)$.

A proportional coefficient of the output was obtained from the measured value of the magnetoresistive film having the constitution of Ta (40 angstroms)/NiFe (17 angstroms)/PdPtMn (150 angstroms)/CoFeB (12 angstroms)/Ru (7.5 angstroms)/CoFeB (25 angstroms)/Cu (24 angstroms)/CoFeB (10 angstroms)/NiFe (40 angstroms)/Ta (10 angstroms), in which the total interlayer coupling field $H_{in}$ applied to the free magnetic layer was 2.4 kA/m.

Figure 9:
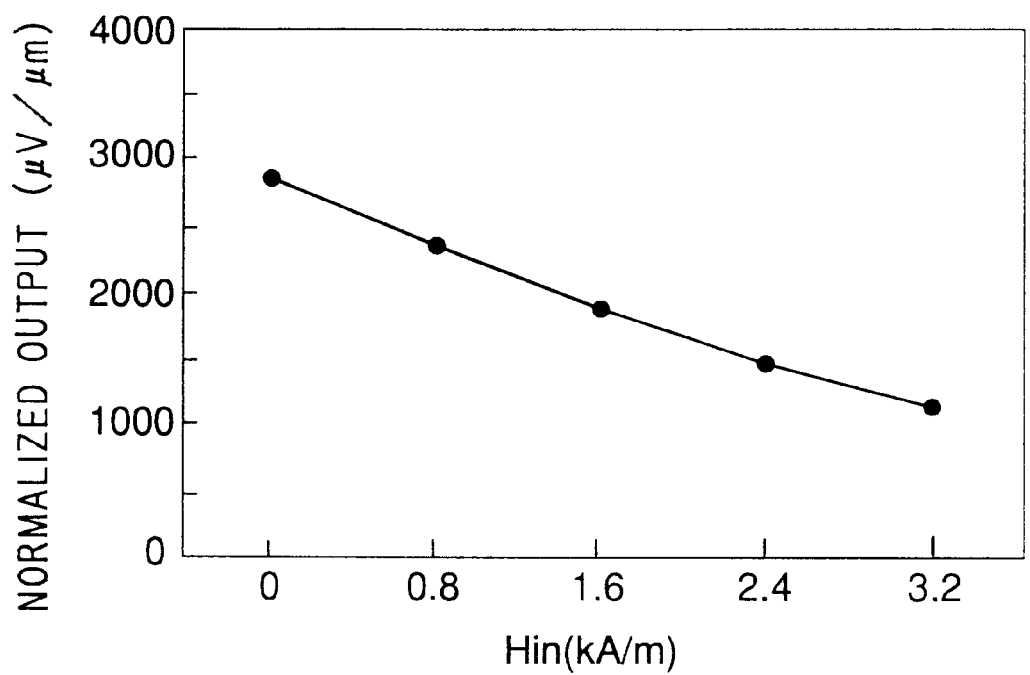
FIG. 9 is a graph showing the dependence of a magnetic head regeneration output on a magnitude of the total interlayer coupling field $H_{in}$.

FIG. 9 is a graph showing the dependence of the magnetic head regeneration output on the magnitude of the total interlayer coupling field $H_{in}$.

The abscissa of FIG. 9 shows the total interlayer coupling field $H_{in}$ applied to the free magnetic layer of the magnetoresistive film, and the ordinate of FIG. 9 shows a normalized output of the magnetic head provided with the magnetoresistive film. In FIG. 9, simulation results are shown by black circles, and the black circles are guided and connected by a solid line.

As shown by the black circles of FIG. 9, when the total interlayer coupling field $H_{in}$ decreases to 0 kA/m from 3_2 kA/m, the normalized output monotonously increases to 2800 $\mu$V/$\mu$m from 1200 $\mu$V/$\mu$m.

As seen from the simulation results, by reducing the total interlayer coupling field $H_{in}$, the output of the magnetic head can be increased.

As described above, according to the present invention, there are provided the magnetoresistive head in which the interlayer coupling field $H_{in}$ applied to the free magnetic layer is minimized, and the information regeneration apparatus provided with the magnetoresistive head.

What is claimed is:

1. A magnetoresistive head, provided with a magnetoresistive film being a multilayered film including: a pinned magnetic layer having magnetization whose direction is fixed; a free magnetic layer having magnetization whose direction changes in accordance with an external magnetic field; and a first nonmagnetic layer held by the pinned magnetic layer and the free magnetic layer in a layer thickness direction, and indicating a magnitude of resistance in accordance with an angle formed by the magnetization direction of the pinned magnetic layer and the magnetization direction of the free magnetic layer, for detecting the magnitude of resistance of the magnetoresistive film to detect a strength of said external magnetic field, said magnetoresistive head comprising:

a second nonmagnetic layer disposed adjacent to the surface of said free magnetic layer on a side opposite to the surface of the free magnetic layer on a side of said first nonmagnetic layer; and a bias application layer, disposed to make direct contact with the surface of the second nonmagnetic layer on a side opposite to the surface of the second nonmagnetic layer on the side of said free magnetic layer, for applying, to the free magnetic layer, a bias magnetic field generated by a static interlayer coupling and directed in a direction opposite to the magnetization direction of said pinned magnetic layer, wherein the bias application layer comprises an antiferromagnetic material of an ordered form.

2. The magnetoresistive head according to claim 1 wherein said first nonmagnetic layer comprises copper or an alloy including copper and has a thickness of 26 angstroms or less.

3. The magnetoresistive head according to claim 1 wherein said second nonmagnetic layer comprises copper or an alloy including copper and has a thickness in a range of 5 angstroms to 20 angstroms.

4. A magnetoresistive head, provided with a magnetoresistive film being a multilayered film including: a pinned magnetic layer having magnetization whose direction is fixed; a free magnetic layer having magnetization whose direction changes in accordance with an external magnetic field; and a first nonmagnetic layer held by the pinned magnetic layer and the free magnetic layer in a layer thickness direction, and indicating a magnitude of resistance in accordance with an angle formed by the magnetization direction of the pinned magnetic layer and the magnetization direction of the free magnetic layer, for detecting the magnitude of resistance of the magnetoresistive film to detect a strength of said external magnetic field, said magnetoresistive head comprising:

a second nonmagnetic layer disposed on a side of said free magnetic layer opposite to said first nonmagnetic layer; and a bias application layer, disposed to make direct contact with said second nonmagnetic layer on a side of said second nonmagnetic layer opposite to said free magnetic layer, for applying, to said free magnetic layer, a bias magnetic field generated by a static interlayer coupling, directed in a direction opposite to the magnetization direction of said pinned magnetic layer and having a strength of 800 Am or more.

5. The magnetoresistive head according to claim 4 wherein said bias application layer comprises an ordered form antiferromagnetic material.

6. An information regeneration apparatus comprising a magnetic head, disposed in the vicinity of or in contact with a magnetic recording medium on which information is recorded by a magnetization direction, for detecting the magnetization direction of each point of the magnetic recording medium, to regenerate the information in accordance with the magnetization direction of each point of said magnetic recording medium detected by the magnetic head, said magnetic head, provided with a magnetoresistive film being a multilayered film including: a pinned magnetic layer having magnetization whose direction is fixed; a free magnetic layer having magnetization whose direction changes in accordance with an external magnetic field; and a first nonmagnetic layer held by the pinned magnetic layer and the free magnetic layer in a layer thickness direction, and indicating a magnitude of resistance in accordance with an angle formed by the magnetization direction of the pinned magnetic layer and the magnetization direction of the free magnetic layer, for detecting the magnitude of resistance of the magnetoresistive film to detect a strength of said external magnetic field, said magnetic head comprising:

a second nonmagnetic layer disposed adjacent to the surface of said free magnetic layer on a side opposite to the side of said first nonmagnetic layer; and a bias application layer, disposed to make direct contact with the surface of said second nonmagnetic layer on a side opposite to the side of said free magnetic layer, for applying, to said free magnetic layer, a bias magnetic field generated by a static interlayer coupling and directed in a direction opposite to the magnetization direction of said pinned magnetic layer, the bias application layer comprising an antiferromagnetic material of an ordered form.

7. An information regeneration apparatus comprising a magnetic head, disposed in the vicinity of or in contact with a magnetic recording medium on which information is recorded by a magnetization direction, for detecting the magnetization direction of each point of the magnetic recording medium, to regenerate the information in accordance with the magnetization direction of each point of said magnetic recording medium detected by the magnetic head, said magnetic head, provided with a magnetoresistive film being a multilayered film including: a pinned magnetic layer having magnetization whose direction is fixed; a free magnetic layer having magnetization whose direction changes in accordance with an external magnetic field; and a first nonmagnetic layer held by the pinned magnetic layer and the free magnetic layer in a layer thickness direction, and indicating a magnitude of resistance in accordance with an angle formed by the magnetization direction of the pinned magnetic layer and the magnetization direction of the free magnetic layer, for detecting the magnitude of resistance of the magnetoresistive film to detect a strength of said external magnetic field, said magnetic head comprising:

a second nonmagnetic layer disposed on a side of said free magnetic layer opposite to the first nonmagnetic layer; and a bias application layer, disposed to make direct contact with said second nonmagnetic layer on a side of said second nonmagnetic layer opposite to said free magnetic layer, for applying, to said free magnetic layer, a bias magnetic field generated by a static interlayer coupling, directed in a direction opposite to the magnetization direction of said pinned magnetic layer and having a strength of 800 A/m or more.

8. The information regeneration apparatus according to claim 7 wherein said bias application layer comprises an ordered form antiferromagnetic material.

* * * * *

UNITED STATES PATENT AND TRADEMARK OFFICE
CERTIFICATE OF CORRECTION

PATENT NO. : 6,819,533 B2
DATED : November 16, 2004
INVENTOR(S) : Kenji Noma et al.

It is certified that error appears in the above-identified patent and that said Letters Patent is hereby corrected as shown below:

Column 22,
Line 38, delete "Am" and insert -- A/m --.

Signed and Sealed this

Tenth Day of May, 2005

JON W. DUDAS
*Director of the United States Patent and Trademark Office*